United States Patent [19]
Tognoni

[11] Patent Number: 6,129,444
[45] Date of Patent: Oct. 10, 2000

[54] DISPLAY BACKLIGHT WITH WHITE BALANCE COMPENSATION

[75] Inventor: Keith Tognoni, Duluth, Ga.

[73] Assignee: L-3 Communications Corporation, Alpharetta, Ga.

[21] Appl. No.: 09/209,390

[22] Filed: Dec. 10, 1998

[51] Int. Cl.⁷ .................................................. F21V 23/00
[52] U.S. Cl. ........................... 362/295; 362/231; 362/31; 362/260
[58] Field of Search ...................... 40/444, 581; 375/294, 375/295; 362/230, 231, 295, 26, 27, 31, 260

[56] References Cited

U.S. PATENT DOCUMENTS

| | | |
|---|---|---|
| 1,348,957 | 8/1920 | Pope .......................................... 40/444 |
| 3,143,300 | 8/1964 | Way .......................................... 362/231 |
| 3,805,049 | 4/1974 | Frank et al. .............................. 362/231 |
| 3,816,739 | 6/1974 | Stolov ...................................... 362/231 |
| 4,380,791 | 4/1983 | Nishizawa ................................ 362/230 |
| 4,490,777 | 12/1984 | Tanner et al. ............................ 362/231 |
| 4,535,394 | 8/1985 | Dugre ....................................... 362/231 |
| 4,641,446 | 2/1987 | Jackson et al. ............................ 40/444 |
| 5,876,107 | 3/1999 | Parker et al. .............................. 362/31 |

*Primary Examiner*—Alan Cariaso
*Attorney, Agent, or Firm*—Gardner & Groff P.C.

[57] ABSTRACT

A backlight for a flat panel display includes a light-combining wedge which combines light from multiple light sources before sending it through the flat panel display, with the light-combining wedge receiving light from two lamps, with each of the lamps producing a different color of light. A control element is used to vary the luminance of one of the lamps relative to the other to allow for an adjustable mixing of colors and thus provides an adjustable white balance.

11 Claims, 4 Drawing Sheets

DISPLAY BACKLIGHT WITH WHITE BALANCE COMPENSATION

TECHNICAL FIELD

The present invention relates generally to display systems and in particular relates to a backlight for a flat panel display.

BACKGROUND OF THE INVENTION

For displaying electronic images and information, two types of displays are predominant. The first is a cathode ray tube (CRT) and the other is a flat panel display. In a CRT display, such as is commonly used in television sets and computer monitors, red, green and blue light is generated and is mixed together to represent desired colors. In such a scheme, white balance can be carefully controlled by varying the intensity of each of the red, green, and blue light sources. Moreover, the overall intensity of the image can be controlled as well. Thus, CRT displays are capable of producing images with accurate color representation and good intensity. However, CRT displays tend to require a lot of space in order to allow for the tube along which the cathode projects the emissions that cause the phosphorescent glow on the front of the CRT display screen.

By contrast, flat panel displays require very little space. However, they generally suffer from being low intensity. One example of a flat panel display is a liquid crystal display (LCD). In high performance applications, the so-called AMLCD (active matrix liquid crystal display) is often employed.

In order to improve the visibility (brightness) of these flat panel displays, it has been known in the art to provide a backlight for directing light through the flat panel display to illuminate it from behind. The backlight is normally constructed of a light-combining wedge designed to be placed closely behind the flat panel display. The light-combining wedge is provided with light by multiple light sources (typically white light sources) positioned along the edges of the light-combining wedge. In order to ensure a proper white balance, the light sources (bulbs or lamps) are very carefully selected to have very specific output characteristics. This tends to require the use of very expensive lamps in order to ensure that the backlight provides reasonably good white balance. Unfortunately, not only must such lamps be high-performance and expensive, such arrangements tend to require very specific lamps, thereby making it impractical to use common or readily available lamps without adversely affecting the white balance of the display backlight. This also makes it difficult to achieve uniform performance in the manufacture of multiple copies of a backlight, as there can be slight performance variations from one lamp to the next. Also, such an arrangement can be difficult to adjust in the field in use to achieve the proper white balance.

Accordingly, it can be seen that a need yet remains for a backlight for a display, which backlight allows the use of standard, readily-available lamps, which allows a broad range of white balance compensation adjustment, and which can be adjusted in the field in use. It is to the provision of such a backlight that the present invention is primarily directed.

SUMMARY OF THE INVENTION

Briefly described, in a first preferred form the present invention comprises a backlight for a display, such as for a flat panel display. The backlight includes a combining element for combining light from multiple light sources, with the combining element being adapted to be positioned behind a flat panel display so that combined light can be projected through the flat panel display. The backlight further includes a first light source which includes a first lamp positioned for directing light into the combining element. The backlight also includes a second light source which includes a second lamp position for directing light into the combining element. The second lamp has a different color characteristic than the first lamp. An electrical drive circuitry for driving the first and second lamps is provided and includes a control element for varying the luminance of one of the first and second lamps relative to the other of the first and second lamps.

Preferably, the electrical drive circuitry includes a first means for varying the luminance of the first lamp and a second means for varying the luminance of the second lamp. Alternately, the luminance of one of the lamps can be held constant, while the luminance of the other of the lamps is varied.

Also preferably, the overall luminance of the backlight (the combined luminance of the first and second lamps) is controlled, while the relative luminance of one lamp in relation to the other is controlled separately.

Preferably, the lamps are driven by individual, separate drive circuits. Preferably, the drive circuits are independent enough of each other so that as one drive circuit is adjusted to vary the luminance of one of the lamps, the luminance of the other lamp can be maintained substantially constant. Alternately, two drive circuits can be employed, with one drive circuit directly driving one lamp and indirectly driving another lamp through a second drive circuit such that the first drive circuit can be used to adjust the overall intensity of the two lamps together, while the second drive circuit can be operated alone (independently of the first drive circuit) to adjust the white balance compensation of the backlight.

A backlight according to the present invention has numerous advantages. One such advantage is the ability to achieve good white balance compensation while using standard, readily-available lamps. Moreover, the invention allows very precise control of the white balance of a display backlight. This is particularly useful in the field to allow the operator of the equipment incorporating the backlight to adjust to whatever local conditions prevail.

Accordingly, it is an object of the present invention to provide a display backlight which allows the manufacturing of displays with careful control of white balance compensation.

It is another object of the present invention to provide a display backlight which allows the use of readily-available lamps.

It is another object of the present invention to provide a display backlight which allows the use of lower-cost lamps having wider performance tolerances.

It is yet a further object of the present invention to provide a display backlight which allows active (on-the-fly) backlight compensation.

It is yet a further object of the present invention to provide a backlight for a display which allows a broad range of adjustments of white balance compensation.

It is another object of the present invention to provide a backlight for a flat panel display with improved performance at a lower cost.

It is yet a further object of the present invention to provide a backlight for a flat panel display which is simple in its design and construction.

It is another object of the present invention to provide a backlight for a flat panel display which allows continued use of the display and backlight even if an individual lamp of the associated backlight should fail.

It is yet a further object of the present invention to provide a backlight for a display which exhibits improved flexibility in the design and use of such a backlight.

These and other objects, features, and advantages of the present invention will become more apparent upon reading the following specification.

BRIEF DESCRIPTION OF THE DRAWING FIGURES

DETAILED DESCRIPTION OF THE PREFERRED EMBODIMENTS

Figure 1:
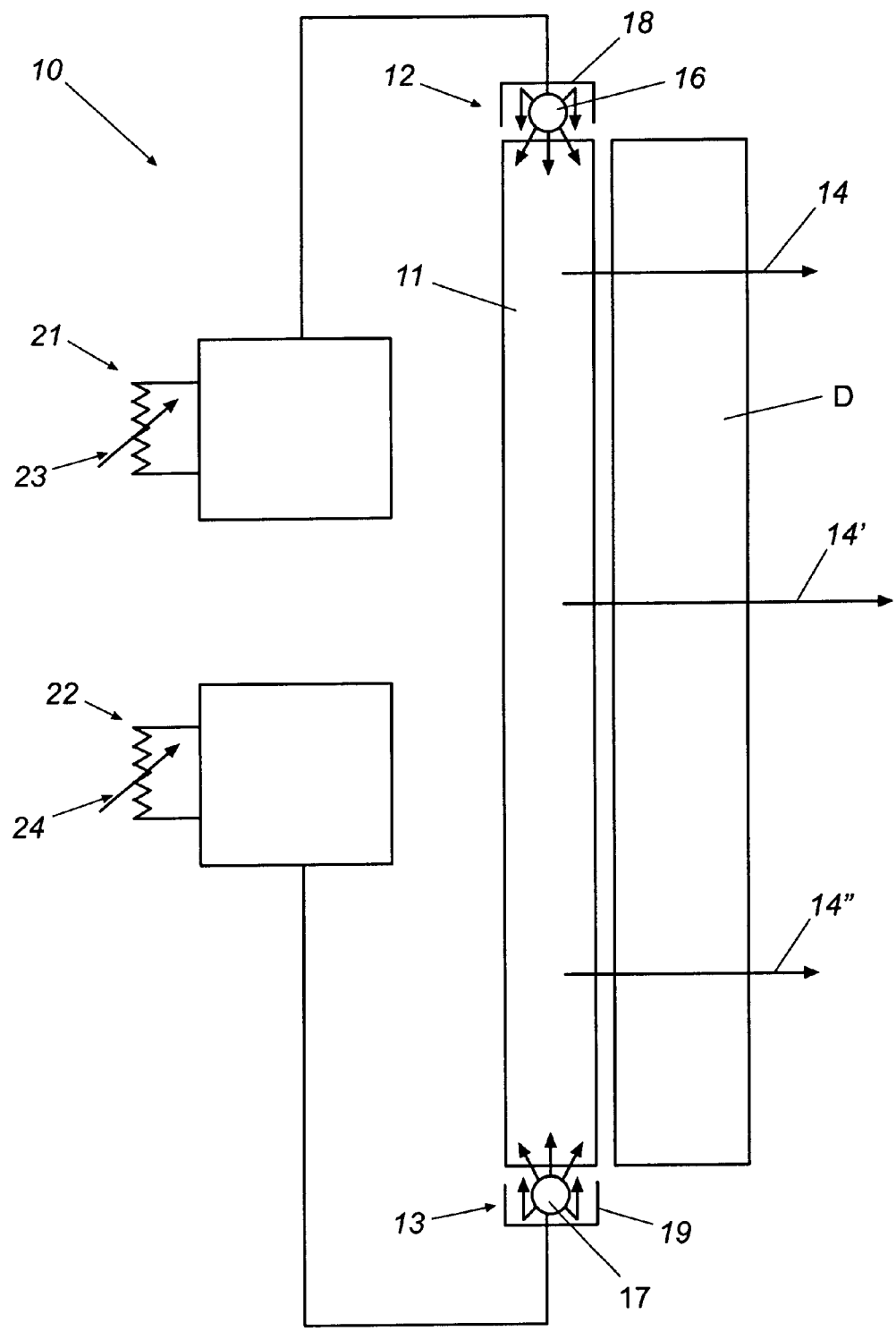
FIG. 1 is a schematic, somewhat functional illustration of a backlight according to a preferred form of the present invention and shown in conjunction with a flat panel display and in particular showing independent drive circuits for each light source.

Referring now in detail to the drawing figures, wherein like reference numerals represent like parts throughout the several views, FIG. 1 shows a backlight apparatus 10 for use with a flat panel display D. Typically, such a flat panel display D would be in the form of an LCD display or an AMLCD display. The backlight apparatus 10 includes, as is schematically shown in FIG. 1, a light combining element (wedge) 11 which is positioned closely adjacent and behind the flat panel display D. The light combining wedge 11 is a technology which is well developed in the art. Such a light combining wedge 11 operates to combine light from two light sources indicated generally at 12 and 13 and to produce collimated light which is projected through the flat panel display D. This collimated light is indicated schematically by arrows 14, 14' and 14".

Each of the light sources 12, 13 includes at least one lamp 16,17 and a shade or reflector 18,19. While each of the light sources 12,13 is depicted as including a single lamp 16,17, those skilled in the art will recognize that multiple lamps can be employed in each light source. Indeed, it is common to use multiple long, thin flourescent lamps positioned along the side edges of the light combining wedge 11. The reflectors 18,19 are used to help direct more of the light output from the lamps into the light combining wedge 11.

It is important to note that the light sources 12 and 13 are chosen to have different color characteristics. For example, one of the light sources can be chosen to be slightly more red than the other or slightly more blue. It is not critical whether or which one of the light sources is slightly more red, green, or blue. What is important is that there be some difference in color between these two light sources so that the intensity of one or the other of the light sources can be adjusted relative to the other light source in order to achieve a good white balance compensation. This is in stark contrast to the known prior art in which all of the lamps used in both light sources would be identical and produce identical color light. The light combining wedge 11 mixes these two different colors of light and produces a single uniform output light whose ultimate color can be controlled by varying the intensity of one or the other of the light sources 12,13.

Still referring to FIG. 1, it can be seen that the backlight apparatus 10 can be provided with completely separate electrical drive circuits 21,22. In this way, the relative intensity (luminance) of one or the other or both of the light sources can be adjusted. Thus, the luminance of light source 12 can be adjusted while holding the luminance of light source 13 substantially constant. Conversely, with the arrangement shown in FIG. 1, the luminance of light source 13 can be adjusted up or down while holding the luminance of light source 11 substantially constant. This provides maximum flexibility in terms of adjusting the white balance of the resulting output light.

Those skilled in the art will recognize that there are various well-known ways in which the individual drive circuits 21 and 22 can be implemented. For example, each of the electrical drive circuits 21,22 can be provided with a rheostat 23,24 for varying a voltage applied to the lamps to vary the luminance of the lamps. Moreover, those skilled in the art will also recognize that other ways of varying the luminance of the lamps can be employed. For example, rather than varying the voltage applied to the lamps using a rheostat, one can vary the duration of time over which the voltage is applied to the lamp in relation to the time in which no voltage is applied to the lamp in order to vary the luminance of the lamp. This is the so-called "pulse width modulation" technique commonly used in many situations in which it is desirable to control the output of an electrical device. In a pulse width modulation scheme, the voltage applied to the device, here the lamp, is held constant, but is turned on and off rapidly and the output of the device is controlled by varying (modulating) the duration of the "on" time of the voltage in relation to the "off" time. This technique is well-suited to applications having digital electronics or using a microprocessor controller.

Figure 2:
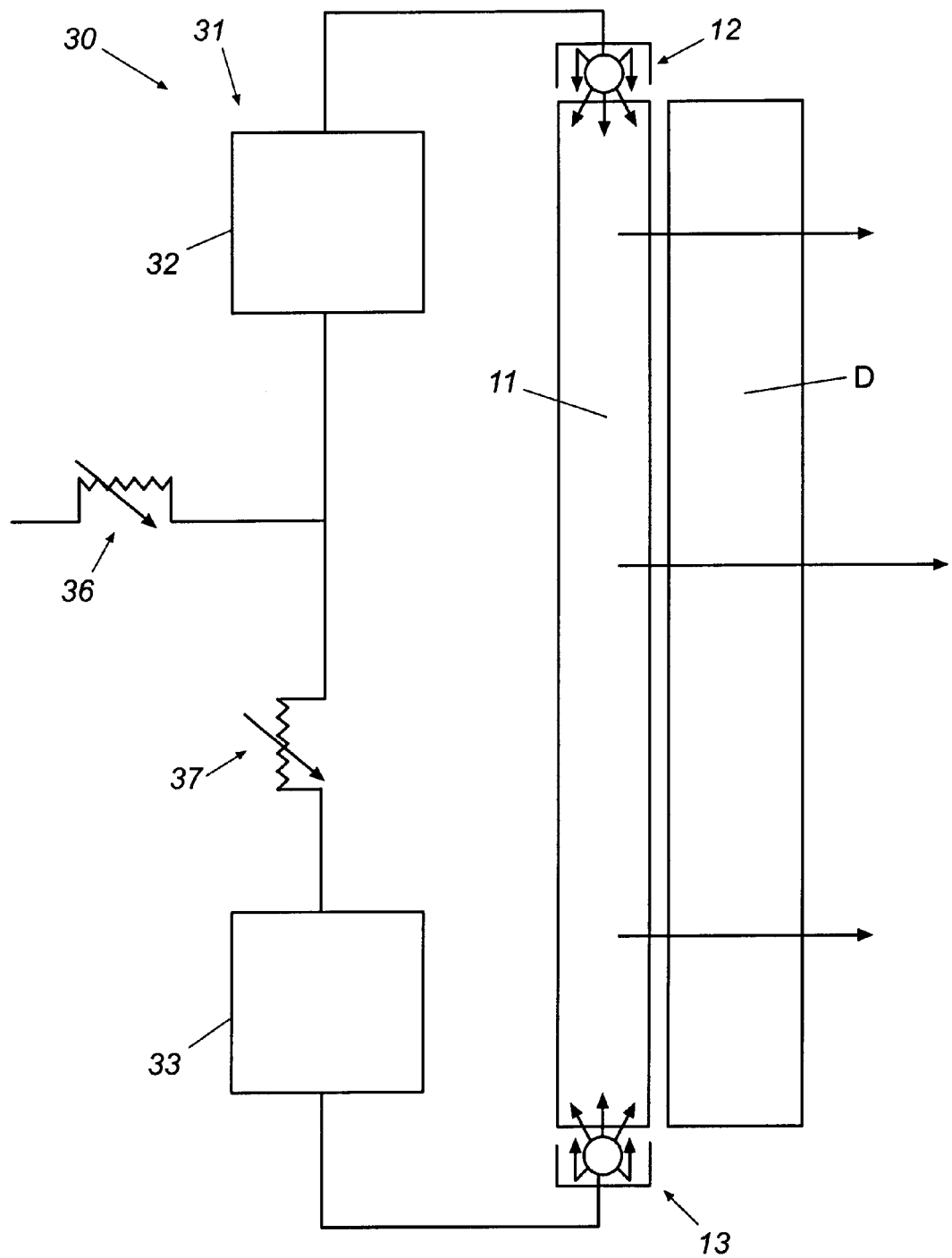
FIG. 2 is another schematic, somewhat functional illustration of a backlight according to the present invention and shown in a slightly modified version from that depicted in FIG. 1.

FIG. 2 shows a modified form of the backlight apparatus 30. In this modified form, the backlight apparatus 30 is very similar to the backlight apparatus 10 of FIG. 1, with the main difference coming in the drive circuitry and control elements. For example, the modified backlight apparatus 30 of FIG. 2 still is to be used with a flat panel display D and includes a light-combining wedge 11 and light sources 12 and 13. However, rather than using the two isolated, independent electrical drive circuits depicted in FIG. 1, the modified backlight apparatus 30 of FIG. 2 includes an integrated electrical drive circuitry indicated generally at 31 and which includes basic lamp drivers 32 and 33. A common dimming adjustment control element (e.g., a rheostat) 36 is used to change the output control voltage provided to both basic drivers 32,33 to enable the total luminance to be adjusted up or down, while not affecting the white balance. A balance dimming adjustment control element (e.g., a rheostat) 37 is positioned in series with the common dimming control element 36 and upstream of the basic lamp driver circuit 33 to allow the output control voltage supplied to the basic lamp driver circuit 33 to be adjusted up or down so that the luminance of light source 13 can be adjusted up or down, while holding the luminance of light source 12 substantially constant.

Figure 2A:
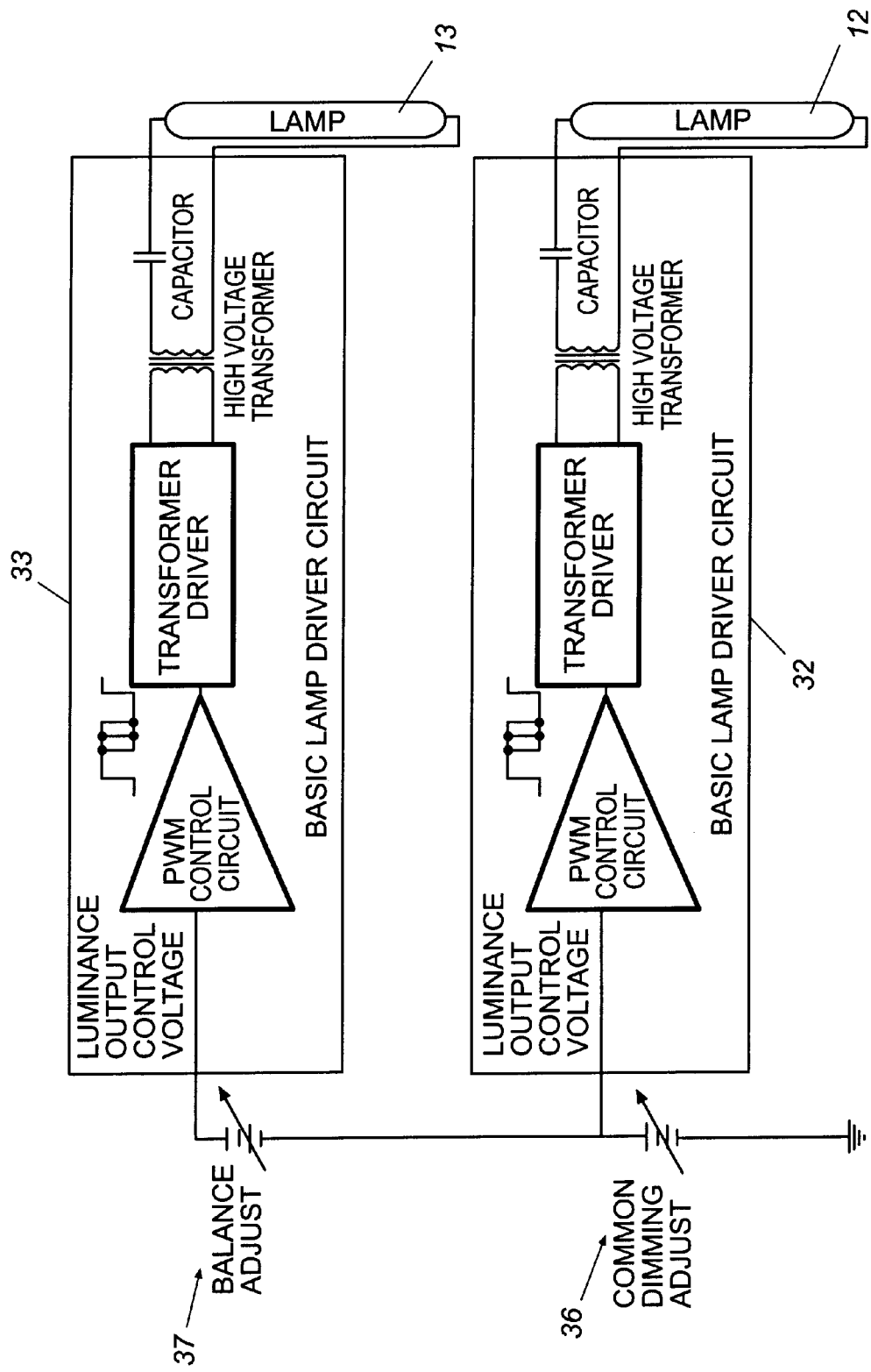
FIG. 2A is a detailed schematic of a portion of the backlight of FIG. 2.

The details of the basic lamp driver circuits 32,33 can be easily grasped by those skilled in the art, and they will recognize that such lamp driver circuitry is well-known in the art. One typical example might include a pulse-width modulator control circuit acting on the control voltage and being used to control a transformer driver in turn controlling a high-voltage transformer for delivering power to the flourescent lamp. FIG. 2A shows an example of how the backlight apparatus 30 of FIG. 2 can be implemented in a specific illustrative embodiment. Of course, those skilled in the art will recognize that other particular driving circuits can be employed.

Figure 3:
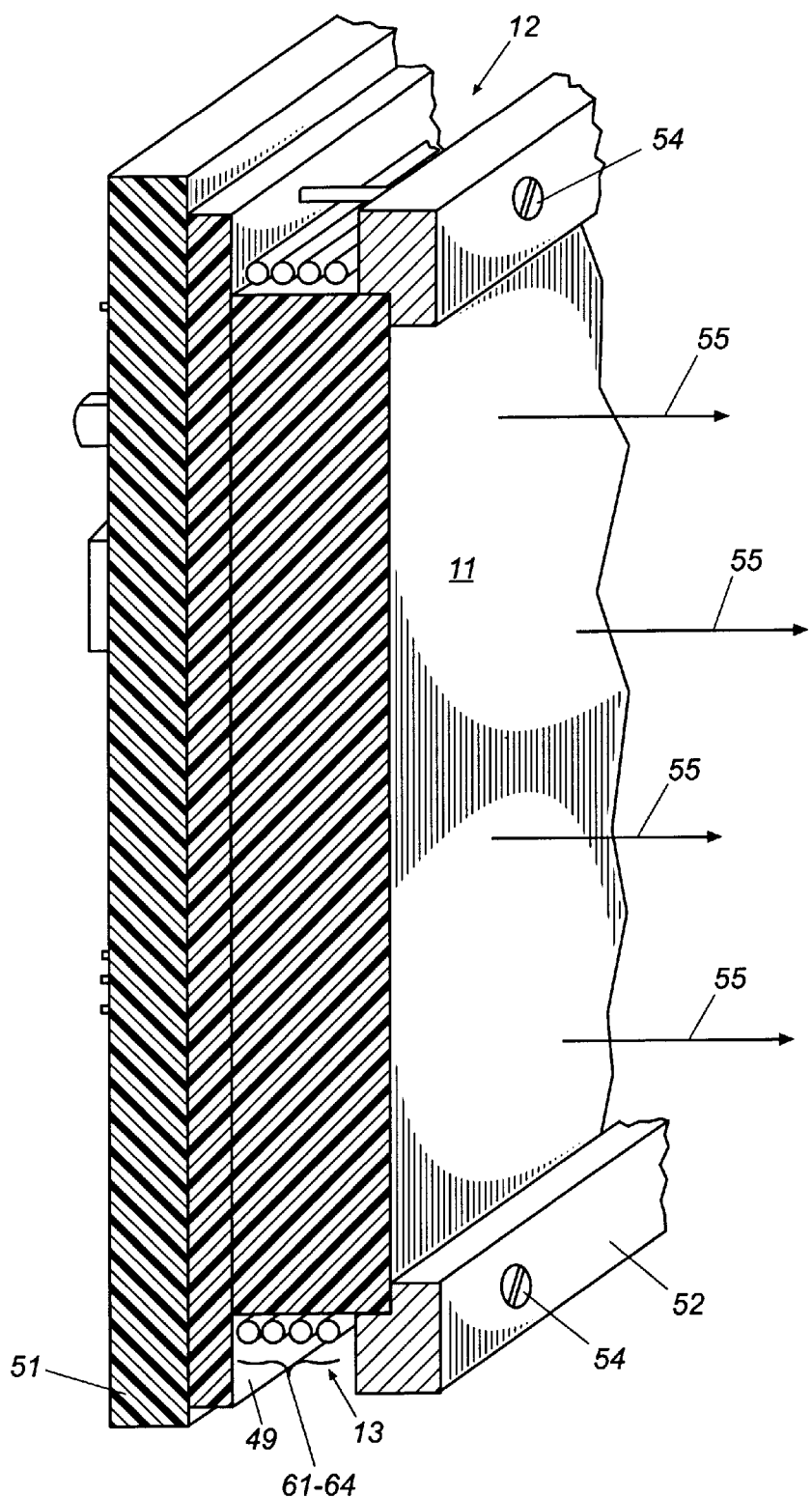
FIG. 3 is a perspective, sectional view depicting a backlight according to the present invention and omitting some elements for the sake of clarity.

FIG. 3 shows an example of a physical embodiment of the present invention. As shown in FIG. 3, the light-combining wedge 11 is positioned closely adjacent and in front of a backing 49. A circuit board 51 is positioned behind and secured to the backing 49. The light-combining wedge 11 is secured to the backing 49 with a peripheral metal frame 52 and suitable mounting fasteners, such as fasteners 53 and 54.

Light sources 12 and 13 can be seen to include numerous thin, long flourescent lamps. In the specific embodiment shown in FIG. 3, each light source comprises 4 identical thin, long flourescent lamps 61–64. In this figure, the reflectors are omitted for the sake of clarity of illustration. Light from the lamps is directed in through the sides of the light-combining wedge 11, from whence it is collimated and directed outwardly in the direction of direction arrows 55. This light then passes through the unshown flat panel display for backlighting the display.

In addition to adjusting the white balance when all of the bulbs are operating in each light source, those skilled in the art will recognize that the present invention allows the backlight to be adjusted to maintain good function even in the face of one lamp within a multi-lamp light source failing completely.

While the invention has been disclosed in preferred forms, those skilled in the art will recognize that many modifications, additions, and deletions can be made therein without departing from the spirit and scope of the invention as set forth in the following claims.

What is claimed is:

1. A flat panel display assembly, comprising:
   a flat panel display;
   a backlight positioned behind said flat panel display and including:
      a combining element for combining light from multiple light sources, said combining element being positioned behind said flat panel display so that combined light can be projected through said flat panel display;
      a first light source comprising a first flourescent lamp positioned for directing light into said combining element;
      a second light source comprising a second flourescent lamp positioned for directing light into said combining element, said second flourescent lamp having a different color characteristic than said first flourescent lamp; and
      an electrical drive circuitry for driving said first and second flourescent lamps and including a control element for varying the luminance of one of said flourescent lamps relative to the other of said flourescent lamps.

2. A flat panel display assembly as claimed in claim 1 wherein said electrical drive circuitry includes first means for varying the luminance of said first flourescent lamp and further comprising second means for varying the luminance of said second flourescent lamp.

3. A flat panel display assembly claimed in claim 2 wherein said first and second means for varying the luminance of said first and second flourescent lamps are controlled in tandem to adjust the overall brightness of the backlight and are controlled separately to adjust the white balance of the backlight.

4. A flat panel display assembly as claimed in claim 1 wherein said electrical drive circuitry comprises a first drive circuit for driving said first flourescent lamp and a second drive circuit for driving said second flourescent lamp.

5. A flat panel display assembly as claimed in claim 4 wherein said first and second drive circuits are each adjustable for varying the luminance of said first and second flourescent lamps, respectively.

6. A flat panel display assembly as claimed in claim 5 wherein said first and second drive circuits operate independently of one another so that as one drive circuit is adjusted to vary the luminance of one of said flourescent lamps, the luminance of the other of said flourescent lamps can be maintained substantially constant.

7. A flat panel display assembly as claimed in claim 5 wherein said first and second drive circuits can be controlled and are arranged so that one of the drive circuits can be adjusted to vary the luminance of one of said flourescent lamps while the luminance of the other of said flourescent lamps is maintained substantially constant.

8. A flat panel display assembly as claimed in claim 7 wherein the output from one of the drive circuits is linked directly to one of said flourescent lamps and the output of the same drive circuit is also linked to the other drive circuit so that the first and second drive circuits are in a series relationship with respect to the other fluorescent lamp so that by operation of the first drive circuit, the overall luminance of the backlight can be controlled while maintaining the relative luminance of the first flourescent lamp relative to the second flourescent lamp substantially constant, and the second drive circuit can be operated to adjust the relative luminance of the second flourescent lamp relative to the first flourescent lamp while maintaining the luminance of the first flourescent lamp substantially constant.

9. A flat panel display assembly as claimed in claim 1 wherein said electrical drive circuitry includes a rheostat for varying the luminance of one of said flourescent lamps relative to the other of said flourescent lamps.

10. A flat panel display assembly as claimed in claim 1 wherein said electrical drive circuitry uses pulse-width modulation to control the luminance of one of said flourescent lamps relative to the other of said flourescent lamps.

11. In a backlight for a flat panel display, the backlight being of the type having a combining element for combining light from multiple light sources and adapted to be positioned behind the flat panel display so that combined light can be projected through the display, the backlight further including first and second flourescent lamps positioned for directing light into the combining element, the improvement therein comprising:
   one of the flourescent lamps having a different color characteristic than the other of the flourescent lamps and the backlight including a control element for varying the luminance of one of the flourescent lamps relative to the other of the flourescent lamps to allow the white balance of light projected through the display to be adjusted.

* * * * *